(12) United States Patent
Affeldt et al.

(10) Patent No.: US 7,025,181 B2
(45) Date of Patent: Apr. 11, 2006

(54) AUTOMOTIVE BRAKE SYSTEM

(76) Inventors: Wayne W. Affeldt, 10841 Harmel Dr., Columbia, MD (US) 21044; Jeremiah J. Smith, 723 Legends Club Dr., Mt. Pleasant, SC (US) 29466

( * ) Notice: Subject to any disclaimer, the term of this patent is extended or adjusted under 35 U.S.C. 154(b) by 0 days.

(21) Appl. No.: 10/431,415

(22) Filed: May 7, 2003

(65) Prior Publication Data
US 2003/0209393 A1    Nov. 13, 2003

Related U.S. Application Data

(60) Provisional application No. 60/378,828, filed on May 9, 2002.

(51) Int. Cl.
*F16D 65/24* (2006.01)
(52) U.S. Cl. ............... 188/170; 188/72.6; 188/72.9
(58) Field of Classification Search ............ 188/170, 188/167, 72.6, 72.9
See application file for complete search history.

(56) References Cited

U.S. PATENT DOCUMENTS

| | | | | |
|---|---|---|---|---|
| 3,661,234 A | * | 5/1972 | Moederndorfer et al. | ... 188/170 |
| 3,744,596 A | * | 7/1973 | Sander | ... 188/203 |
| 3,976,168 A | * | 8/1976 | Yamamoto | ... 188/71.9 |
| 4,018,140 A | * | 4/1977 | Engle | ... 92/31 |
| 4,036,329 A | * | 7/1977 | Anderson | ... 188/72.7 |
| 4,155,431 A | * | 5/1979 | Johnson | ... 188/170 |
| 5,607,033 A | * | 3/1997 | Naedler et al. | ... 188/71.8 |
| 5,622,240 A | * | 4/1997 | Hartl | ... 188/72.6 |
| 5,671,827 A | * | 9/1997 | Demetriou et al. | ... 188/71.6 |
| 6,230,851 B1 | * | 5/2001 | Yoshizawa et al. | ... 188/71.1 |
| 6,488,132 B1 | * | 12/2002 | Matsuishi | ... 188/73.39 |

* cited by examiner

*Primary Examiner*—Pam Rodriguez
(74) *Attorney, Agent, or Firm*—Harness, Dickey & Pierce, PLC

(57) ABSTRACT

A automotive braking system for use on a vehicle for emergency stopping and parking comprising a mechanical brake caliper which exerts frictional stopping force on a brake rotor, the caliper being designed so as to provide a means of transferring mechanical force to the caliper pistons by means of a lever which transfers mechanical force to the piston through one or more apertures in the piston cylinders. The lever is operated by an actuator rod, which is engaged by a spring chamber having a heavy duty parking spring with and opposing force created by a variable pressure means, typically air or hydraulic. The system fails to a safe-mode mode wherein a loss of pressure opposing the parking spring results in the engagement of the braking system, bringing a moving vehicle to rest within a reasonable distance and holding a vehicle parked until such time the pressure can be restored.

17 Claims, 3 Drawing Sheets

AUTOMOTIVE BRAKE SYSTEM

CROSS-REFERENCE TO RELATED APPLICATIONS

This application claims the benefit of U.S. Provisional Application No. 60/378,828, filed on May 9, 2002.

FIELD OF THE INVENTION

The present invention relates to automotive brake systems. Specifically, the invention relates to hydraulic disc brake systems on light/medium duty vehicles.

BACKGROUND OF THE INVENTION

Light/medium duty vehicles equipped with hydraulic disc brakes have a significant safety issue related to their ability to stop when the hydraulic or power assist system fails. This problem is presently shared by nearly every make and model numbering in the millions. The problem is that the emergency braking capabilities of these vehicles are not adequate. While the current hydraulic braking systems are relatively safe through redundancy, the possibility for complete failure exists and is not too improbable to overlook.

The most commonly used braking system for light/medium duty vehicles is a hydraulic braking system. This system generates its braking fluid pressure by means of a master cylinder, power assistance provided by the power steering pump that is mounted on and powered by the engine. In the event of an engine failure, the engine mounted hydraulic pump will cease to function. Generally a back up electric powered hydraulic pump is used to supply hydraulic-assist pressure to the service brake. However, a safety issue arises when there is a complete failure of the vehicle's electrical system, in that a failure will disable the engine. Further, the back-up electric hydraulic-assist pump will not receive power and will fail to operate when braking is needed. The drive line mounted parking brake, at best, will hold a vehicle parked. However, it is completely incapable of bringing the vehicle to a safe stop within a reasonable distance. This existing system rests in the released position and requires input energy generally by means of a cable to apply.

A large majority of medium duty vehicles, including school buses employ the above-mentioned system. Current parking brakes on medium duty vehicles are prone to failure and do not provide enough holding power. Furthermore, current parking brake systems consist of a manually operated drum brake that is installed somewhere on the drive shaft. Being mounted on the drive shaft, this system is insufficient due to the properties of spider gears in the differential. An example is one rear wheel on a slick surface or in the event a driveline failure occurs. Another type of braking system available for medium duty vehicles is an air braking system. Air brakes do not have the above-mentioned problem because they fail to a safe mode. That is, failure of an air brake system by design will allow spring force to apply the brakes. However, air brakes are much more expensive than hydraulic systems and fall under heavy federal mandates to include required commercial drivers license and strict, frequent maintenance measures.

Thus there is a need for an emergency brake/parking brake system that is completely independent of the service brake system and can be easily and immediately employed on medium duty vehicles to include but not limited to new production and retrofit.

SUMMARY OF THE INVENTION

It is an object of the present invention to provide an emergency/parking brake system that can easily be installed on current and future production light/medium duty vehicles; is simple and easy to maintain; does not modify or rely upon existing service brake systems; and will fail to the safe mode.

It is another object of the present invention to provide an emergency/parking brake system that requires actuator input energy for release, but does not require actuator input energy for application.

It is another object of a the present invention to provide an emergency/parking brake system that requires little maintenance or adjustment.

In a further embodiment, it is an object of the present invention to provide an emergency/parking brake system that has independent brake assemblies on each rear wheel.

These and other objects are achieved by providing an automotive braking system for use on a vehicle for emergency stopping and parking comprising a mechanical brake caliper which exerts frictional stopping force on a brake rotor, the caliper being designed so as to provide a means of transferring mechanical force to the caliper pistons by means of a lever which transfers mechanical force to the piston through one or more apertures in the piston cylinders. The calipers are fully floating and receive no torque, in which they only force pads against the brake rotors, allowing the brake system anchor plate to receive the torque from the brake pads. The lever is operated by an actuator rod, which is engaged by a spring chamber having a heavy duty parking spring with and opposing force created by a variable pressure means, typically air or hydraulic.

The present invention provides completely independent parking and service brake systems, and fails to a safe-mode mode wherein a loss of pressure opposing the parking spring results in the engagement of the braking system, bringing a moving vehicle to rest within a reasonable distance and holding a vehicle parked until such time the pressure can be restored.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

The present invention can be obtained by providing a mechanically operated brake caliper. As shown in the figures, the invention employs a simple lever system connected to an air/spring chamber which actuate the caliper pistons, depressing the brake pads against the brake rotors. As an emergency/parking brake system, the brakes should not have enough power to "lock up" during emergency dynamic braking so that maximum control of the vehicle is still possible. Parking brakes are not dynamic and require less application power than dynamic braking, as is evident by existing parking brake systems. The system disclosed herein is well within the scope needed for successful operation.

Figure 2A:
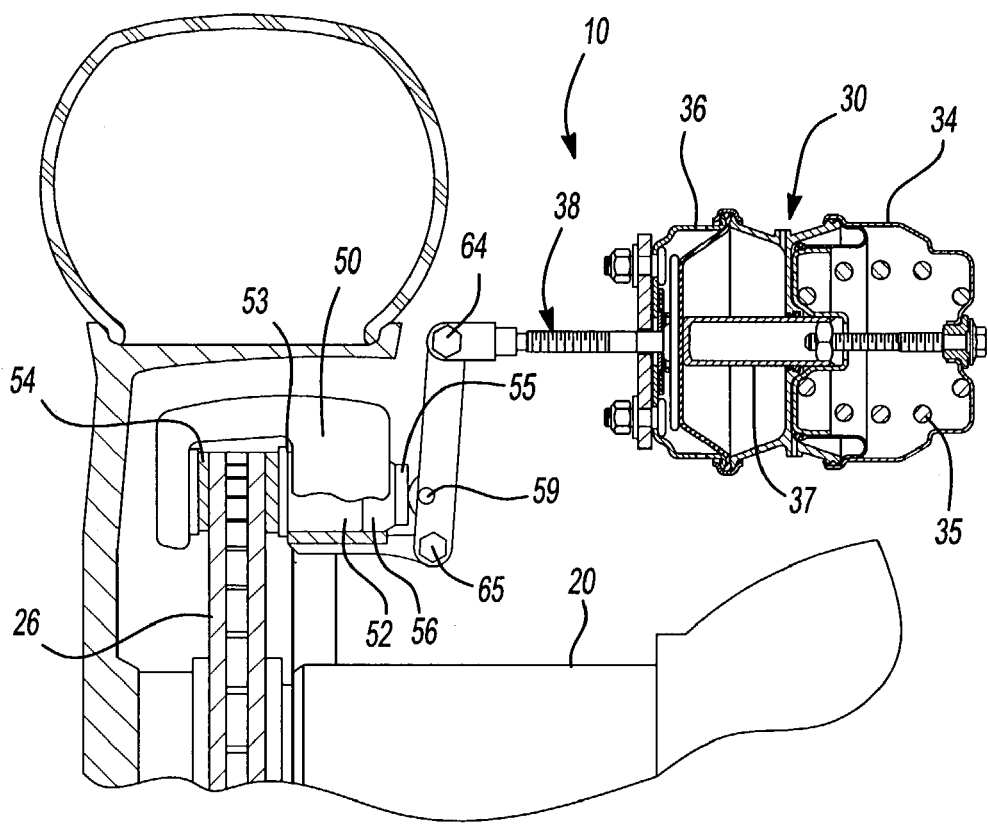
FIG. 2A is a partial-sectional view of the brake system attached to the rear axle of a vehicle with the brake mounting frame omitted, illustrating the engaged position of the brake.
Figure 2B:
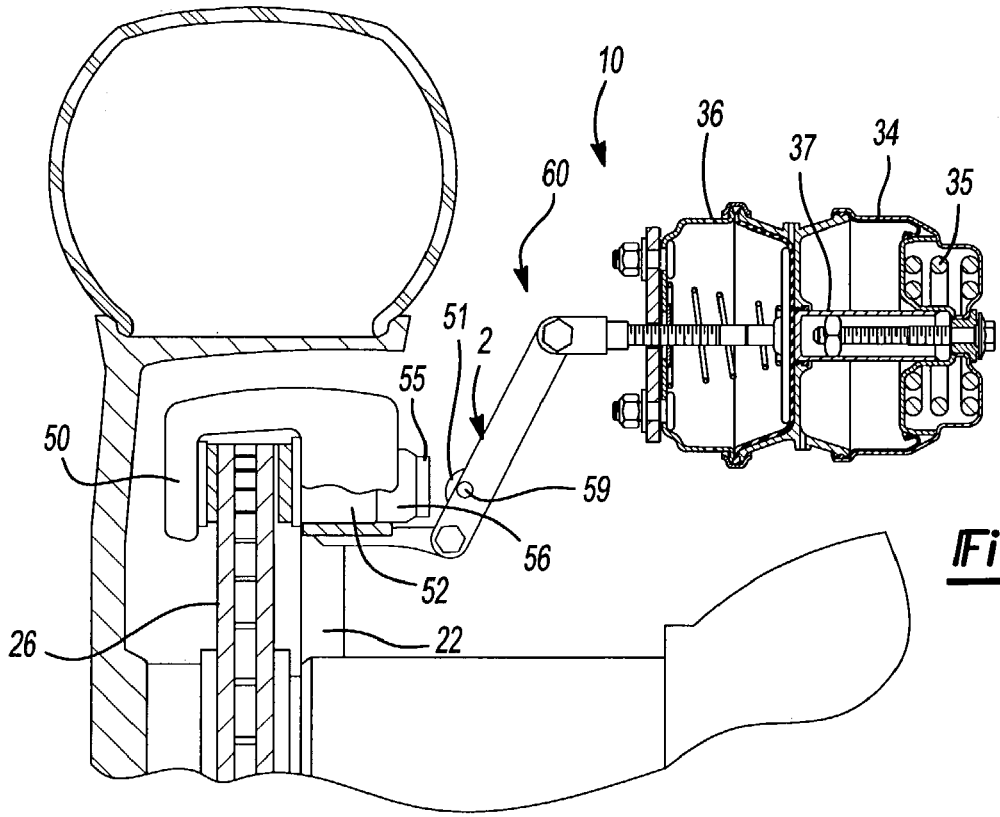
FIG. 2B is a partial-sectional view of the brake system attached to the rear axle of a vehicle with the brake mounting frame omitted, illustrating the disengaged position of the brake.

The emergency/parking caliper utilizes mechanical input versus hydraulic input, as shown in FIGS. 2A and 2B. To achieve this, the back of the caliper is drilled out to expose the rear surface of the pistons. Service brake calipers subject the back of the pistons to hydraulic pressure, whereby the preferred embodiment of the present invention employs a bridging means which connects the pistons and allows a mechanical input to actuate them. The bridge bears the necessary force applied by the lever system, and evenly distributes the force to the pistons in a controlled and sate manner. Typical hydraulic operation does not subject the pistons to lateral forces. A lever system could produce lateral forces, causing possible piston and cylinder scoring. To prevent this, the lever system makes contact with the piston bridge by means of a roller. The roller is not able to transmit any significant lateral forces to the piston bridge by design.

Figure 1:
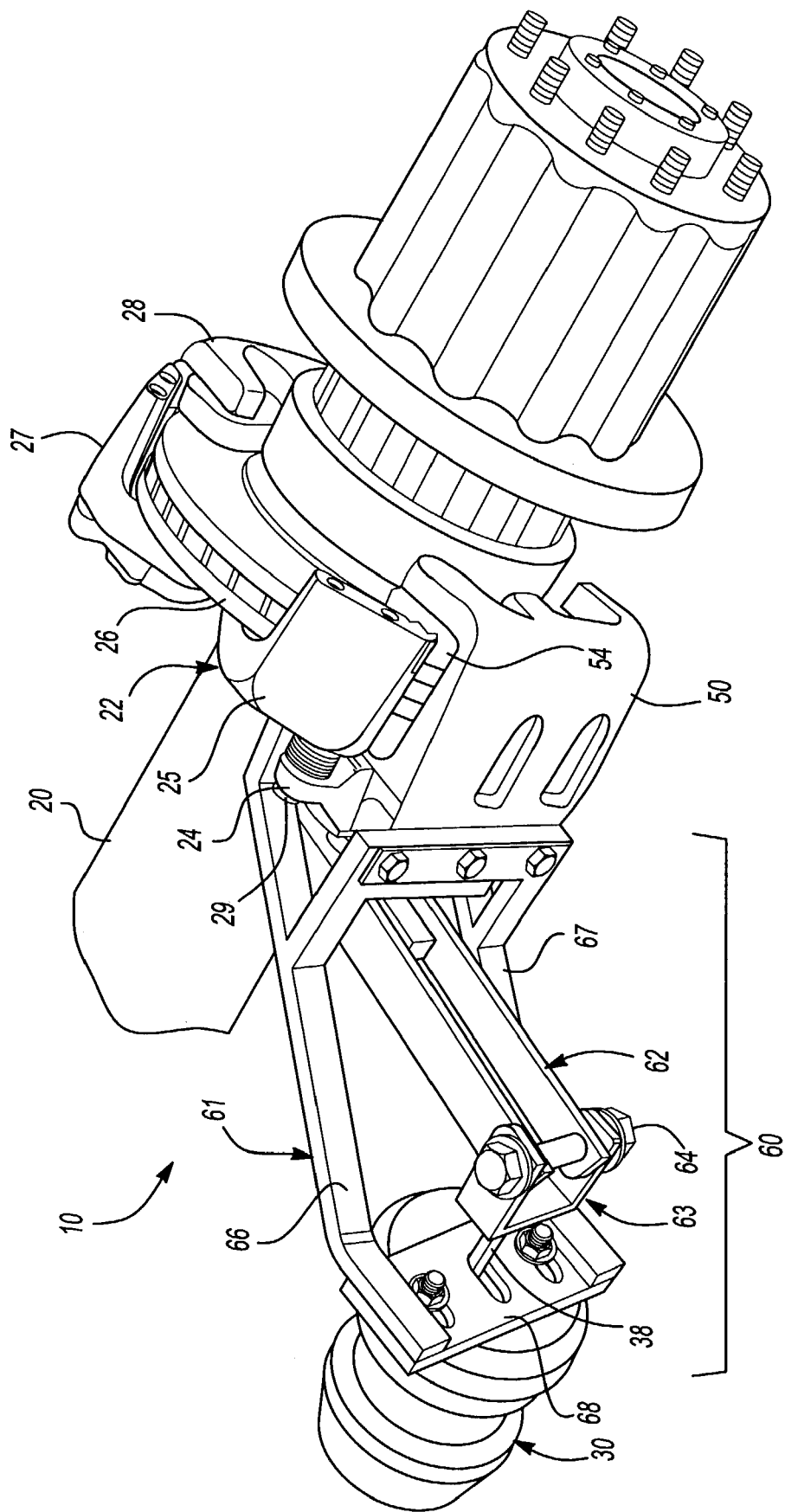
FIG. 1 is a perspective overview view of the brake system attached to the rear axle of a vehicle.
Figure 4:
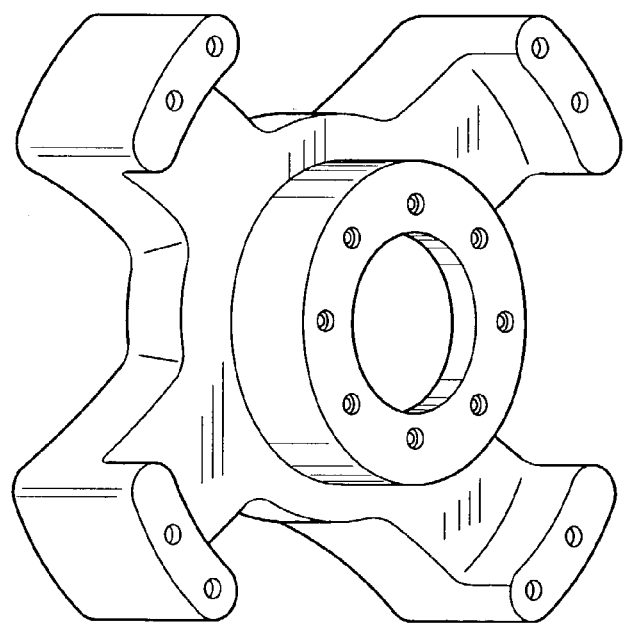
FIG. 4 illustrates a perspective view of the Siamese anchor plate for mounting both a hydraulic service brake and a mechanical parking/emergency on the same brake rotor.

The lever system is designed in a manner that facilitates the required "Fail to Safe" concept, in that when the actuating chamber is relieved of air or fluid pressure, a maximum braking force is developed that will stop and park the vehicle. Furthermore, the system does not hinder the "floating caliper" design, which allows the caliper to receive input from only one side of the rotor, and apply the supplied forces evenly on both faces of the rotor to prevent warping and uneven wear. Thus, the lever system is integral to the caliper, and in a preferred embodiment, dual calipers are utilized on a single brake rotor, mounted to a siamese anchor plate as shown in FIG. 4. This configuration provides mounting for the hydraulic service brake caliper and the mechanically actuated emergency/parking caliper, as shown in FIG. 1. Finally, the system is suitably made to fit into the space available on light/medium duty vehicles.

Referring now to the figures, specifically FIG. 1, the preferred embodiment of the invention is shown, attached to the rear axle of a vehicle, comprising the linkage system 60 attached to the caliper 50 having a spring chamber 30 for engagement/disengagement of the caliper 50 without affecting the normally employed hydraulic service brake system.

Figure 3:
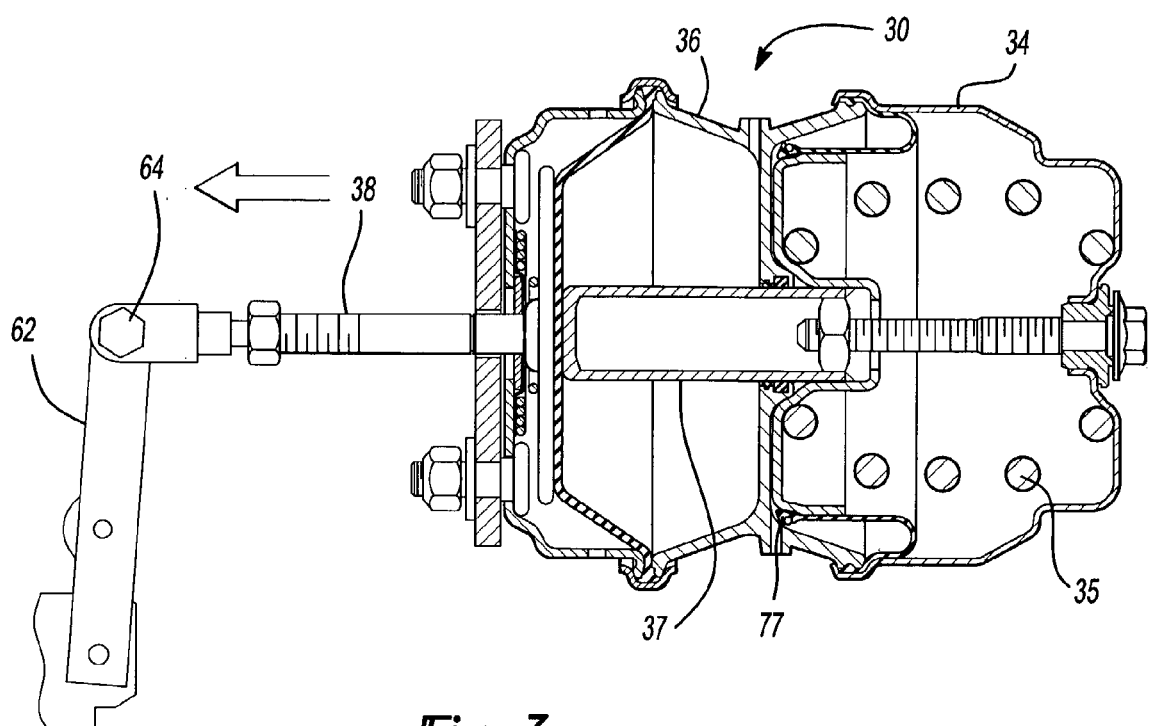
FIG. 3 illustrates an isolated sectional view of the spring chamber operating the lever linkage of the braking system.

Best illustrated in FIGS. 3 and 4, there is shown an example of the spring chamber 30 mechanism of the present invention. Known to those skilled in the art, this provides the force of the present invention through controlled air pressure within chambers 34 and 36 releasing a parking brake spring 35 acting upon plunger 37. Designed to fail to the safe mode, when there is no increased air pressure present, the brake spring 35 is engaged. The spring brake chamber 34 which is charged with air pressure to compress a heavy-duty parking brake spring 35.

The fail-to-safe mode, common on most air brake systems, provides that in the event air pressure is lost (vented) the spring 35 will apply longitudinal force to the actuator rod 38 through the actuator plate 77 and thus causing the emergency brake to stop the vehicle if in motion, or to park the vehicle once stationary. To disengage the braking system 10 and thereby allowing the vehicle to move, the spring chamber 30 must once again be subjected to an increase in air pressure.

Referring now to FIGS. 1, 2A and 2B, The brake pads 53 and 54 utilized in the preferred embodiment provide a frictional surface on the rotor 26 to retard vehicle movement, and are readily obtainable and known by those skilled in the art. The caliper 50 shown, is unique in that it adapts to the means of mechanical braking utilized in the present invention. In service brake applications, the caliper 50 converts hydraulic fluid pressure to mechanical output that is directly applied to a set of brake pads, wherein the present invention, the pistons 52 of the caliper 50 are operated by the mechanical means described below. The caliper 50 is mounted to the Siamese anchor plate 22 adjacent to the brake rotor 26 by an anchoring means 24, the anchor plate 22, attaching to the axle housing 20. In a preferred embodiment, the anchor plate 22 has dual mounting locations 25 and 27 as mentioned, for utilizing both a normal, hydraulically operated service brake caliper 28, and the mechanical emergency/parking brake caliper 50 of the present invention upon the same rotor 26.

The anchoring means 24 in the preferred method of attaching the caliper 50 to the anchor plate 22 comprises two floating pins 29. The caliper 50 is machined so as to bore two holes in the back of the piston cylinders, which allow external mechanical coupling of the pistons 52, comprising the emergency braking system. To maximize reliability and functionality, each piston 52 is subjected to forces that do not exceed those produced in hydraulic applications. To accomplish this, the force produced is applied to the entire back surface area of each piston, by designing the piston coupler 56 interface to have equal surface area to that of the piston 52.

In the preferred embodiment, the coupler 56 is then attached to the piston 52 and a bridging means 55 through the center of each coupler 56, maintaining a solid interface with the piston 52 and bridging means 55. The bridging means 55 delivers and distributes the force to actuate two pistons in a multiple piston caliper application, commonly know in the art.

The lever system is fastened using bolts 64 and 65 at the pivot points. Since large forces are generated in this system, known design methods and techniques are used to account for these forces, and determine which bolt properties and geometries are necessary for reliability. With the primary stresses observed being a shear stress, the preferred embodiment utilized bolts of ¾ inch diameter.

To best illustrate the leverage linking system, FIG. 1 is referred to, showing the various components comprising the system. The linkage 60 is comprised of three individual elements; a mounting frame 61, the lever linkage 62 and the yoke linkage 63. The mounting frame 61 provides a means of attaching the spring chamber 30 to the caliper 50. The lever linkage 62 comprises the lever arm 2, for applying force to the piston couplers 56 via the bridging means 55, and further connects to the spring actuator rod 38 via the pivotal actuator linkage 63, so as to provide the force for engagement of the braking system 10.

The mounting frame 61, attaching the system to the caliper 50, is generally constructed from a pair of parallel angled, square steel arms 66 and 67 with a mounting plate 68 at one end for attaching the spring chamber 30. The mounting plate provides a means, generally an aperture there through, allowing the actuator rod 38 to engage the lever linkage 62. The opposite end of arms 66 and 67 in the preferred embodiment are attached to the caliper 50 body and is braced, for reinforcing the brake system components.

As shown, the lever linkage 62 is pivotally attached to the mounting frame 61 at a first end positioned between the parallel arms 66 and 67 by a pivotal axis bolt 65, shown in FIG. 2A. This pivotal axis provides the lever means for transferring the force applied to the second end of the lever linkage 62 by the pivotally attached actuator linkage 63 attaching to the spring chamber actuator rod 38. A roller 51 is rotatably attached to the lever linkage 62 by bolt 59, and in a preferred embodiment, two rollers are utilized providing a more uniform distribution of force to the bridge 55. The roller 51 transfers force applied to the second end of lever linkage 62 to the bridging means 55, which distributes the force evenly to the caliper piston couplers 56, without inducing lateral force or causing binding of the pistons within the cylinders.

The actuator linkage 63 provides for the pivotal attachment of the spring chamber actuator rod 38 to the lever linkage 62, and is fabricated so as to withstand the required force necessary to actuate the braking system.

The brake system 60 is normally engaged, until such time that air pressure above ambient is introduced into the spring brake chamber 34. While engaged, the actuator arm 38 is extended creating a force on the lever linkage 62 through the actuator linkage 63. This force is carried on to the roller 51, and translates to a longitudinal force upon the bridging means for forcing the plurality of pistons to engage the brake pads 53 and 54 with the rotor 26. Once air pressure is introduced to the spring brake chamber 34, the pressure creates a force upon the actuator plate 77 which compresses the parking spring 35 and retracts the actuator rod 38 into the spring chamber 30. This results in the release of the force upon the lever linkage 62, and in turn the force applied to the pistons 50 through the couplers 56, thereby releasing the brake pads 53 and 54 from the rotor 26.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. In combination with a spring chamber braking mechanism, an automotive disk braking system for an automobile having a preexisting primary braking caliper operative on a brake disk, comprising:

A secondary mechanical brake caliper operative on said disk, said secondary caliper having a body attached to an anchor plate mounted to an axle housing, said secondary caliper comprising at least one piston and one piston cylinder, said piston acting on at least one friction pad against a brake rotor, said secondary caliper having a longitudinal bore through the back of each piston cylinder providing for mechanical force input means;

A mechanical actuator mounting frame integral to said secondary mechanical brake caliper;

A spring chamber for providing parking and fail-safe emergency stopping force attached to said mounting frame having a parking spring with a spring force acting on a actuator plate, said spring being compressed with an increase in an opposing force on said actuator plate, said actuator plate acting to longitudinally retract an actuator rod attached to said actuator plate, said actuator rod having a distal end extending out through an aperture in said spring chamber, said distal end attaching to a actuator linkage;

A means of controlling the opposing force against said actuator plate;

A lever pivotally attached at a first end to said secondary caliper by means of a fixed position pivotal axis bolt pivotally attached through said mounting frame proximal said secondary caliper body, and pivotally attached at a second end to said actuator linkage;

A piston actuator means and coupler extending through said bore between said lever and said piston for transferring said spring force from said lever to said piston;

Wherein when said opposing force against said actuator plate is less than said spring force, said parking spring extends said actuator plate, said actuator plate extending said actuator rod longitudinally out of said spring chamber a finite distance, said actuator linkage attached to said actuator rod transferring said spring force to said lever, said lever transferring said spring force to at least one piston actuator means, said piston actuator means transferring said spring force longitudinally to said piston, said piston transferring said spring force to said friction pad, said friction pad transferring said spring force against said brake rotor.

2. The automotive brake system of claim 1 wherein said opposing force decreases linearly as pressure increases within said spring chamber.

3. The automotive braking system of claim 1 wherein said piston actuator coupler is the same diameter as said piston.

4. The automotive brake system of claim 1 wherein said opposing force is created by air pressure.

5. The automotive brake system of claim 1 wherein said opposing force is created by fluid pressure.

6. The automotive braking system of claim 1 wherein said lever comprises at least one roller means rotatably attached to said lever for transferring the force linearly to said piston actuator means coupler from said lever.

7. The automotive braking system of claim 1 wherein when increased pressure is introduced to said spring chamber, said actuator plate compresses said parking spring, decreasing said spring force.

8. The automotive braking system of claim 6 further comprising a bridging means between said roller means and said piston actuator means coupler for distributing the force exerted by said roller means evenly to at least two piston actuator means couplers, acting on at least two pistons when said spring force is exerted.

9. The automotive brake system of claim 8 wherein the maximum spring force exerted by said automotive brake system is sufficient to bring a moving vehicle to rest within a reasonable specific distance.

10. The automotive brake system of claim 8 wherein the maximum spring force exerted by said automotive brake system is sufficient to prevent a parked vehicle from moving.

11. In combination with a spring chamber braking mechanism, an automotive disk braking system for an automobile having a preexisting primary braking caliper operative on a brake disk, comprising:

A secondary mechanical parking brake caliper operative on said disk, said secondary caliper having a body attached to an anchor plate mounted to an axle housing, said secondary caliper comprising at least one piston and one piston cylinder, said piston acting on at least one friction pad against a brake rotor, said secondary caliper having a longitudinal bore through the back of each piston cylinder providing for mechanical force input means;

A mechanical actuator mounting frame integral to said secondary mechanical brake caliper;

A spring chamber attached to said mounting frame having a parking spring with a spring force acting on a actuator plate, said spring being compressed with an increase in an opposing force on said actuator plate, said actuator plate acting to longitudinally extend and retract an actuator rod attached to said actuator plate, said actuator rod having a distal end extending out through an aperture in said spring chamber, said distal end attaching to a actuator linkage;

A means of controlling the opposing force against said actuator plate;

A lever pivotally attached at a first end to said secondary caliper by means of a fixed position pivotal axis bolt pivotally attached through said mounting frame proximal said secondary caliper body, and pivotally attached at a second end to said actuator linkage; said lever comprising at least one rotatably attached roller means;

A piston actuator means and coupler extending through said bore between said lever and said piston for transferring said spring force from said lever to said piston, said piston actuator coupler having the same diameter as said piston;

Wherein when said opposing force against said actuator plate is less than said spring force, said parking spring extends said actuator plate, said actuator plate extending said actuator rod longitudinally out of said spring chamber a finite distance, said actuator linkage attached to said actuator rod transferring said spring force to said lever, said lever transferring said spring force to at least one piston actuator means, said piston actuator means transferring said spring force longitudinally to said piston, said piston transferring said spring force to said friction pad, said friction pad transferring said spring force against said brake rotor, said opposing force decreasing linearly as pressure increases within said spring chamber.

12. The automotive braking system of claim 11 further comprising a bridging means between said roller means and said piston actuator coupler for distributing the force exerted by said roller means evenly to at least two piston actuator means couplers, acting on at least two pistons when spring force is exerted.

13. The automotive brake system of claim 11 wherein said opposing force is created by air pressure.

14. The automotive brake system of claim 11 wherein said opposing force is created by fluid pressure.

15. The automotive brake system of claim 12 wherein the maximum spring force exerted by said automotive brake system is sufficient to bring a moving vehicle to rest within a reasonable specific distance.

16. The automotive brake system of claim 12 wherein the maximum spring force exerted by said automotive brake system is sufficient to prevent a parked vehicle from moving.

17. In combination with a spring chamber braking mechanism, an automotive disk braking system for an automobile having a preexisting primary hydraulic braking caliper operative on a brake disk, comprising:

An anchor plate, said anchor plate having a means of attaching a mechanical parking brake caliper and said hydraulic brake caliper;

said mechanical brake caliper having a body attached to said anchor plate mounted to an axle housing, said mechanical brake caliper comprising at least one piston and one piston cylinder, said piston acting on at least one friction pad against a brake rotor, said mechanical brake caliper having a longitudinal bore through the back of each piston cylinder providing for mechanical force input means;

A mechanical actuator mounting frame integral to said mechanical brake caliper;

A spring chamber attached to said mounting frame having a parking spring with a spring force acting on a actuator plate, said spring being compressed with an increase in an opposing force on said actuator plate, said actuator plate acting to longitudinally extend and retract an actuator rod attached to said actuator plate, said actuator rod having a distal end extending out through an aperture in said spring chamber, said distal end attaching to a actuator linkage;

A means of controlling the opposing force against said actuator plate;

A lever pivotally attached at a first end to said secondary caliper by means of a fixed position pivotal axis bolt pivotally attached through said mounting frame proximal said secondary caliper body, and pivotally attached at a second end to said actuator linkage; said lever comprising at least one rotatably attached roller means;

A piston actuator means extending through said bore between said lever and said piston for transferring said spring force from said lever to said piston, said piston actuator means having the same diameter as said piston;

Wherein when said opposing force against said actuator plate is less than said spring force, said parking spring extends said actuator plate, said actuator plate extending said actuator rod longitudinally out of said spring chamber a finite distance, said actuator linkage attached to said actuator rod transferring said spring force to said lever, said lever transferring said spring force to at least one piston actuator means, said piston actuator means transferring said spring force longitudinally to said piston, said piston transferring said spring force to said friction pad, said friction pad transferring said spring force against said brake rotor, said opposing force decreasing linearly as pressure increases within said spring chamber.

\* \* \* \* \*